(12) United States Patent
O'Neill

(10) Patent No.: US 9,477,706 B2
(45) Date of Patent: Oct. 25, 2016

(54) SYSTEM AND METHOD FOR STORING AND RETRIEVING DATA

(71) Applicant: Viavi Solutions Inc., Milpitas, CA (US)

(72) Inventor: Cindy O'Neill, Monitou Springs, CO (US)

(73) Assignee: Viavi Solutions Inc., Milpitas, CA (US)

( * ) Notice: Subject to any disclaimer, the term of this patent is extended or adjusted under 35 U.S.C. 154(b) by 470 days.

(21) Appl. No.: 13/856,128

(22) Filed: Apr. 3, 2013

(65) Prior Publication Data
US 2013/0268509 A1    Oct. 10, 2013

Related U.S. Application Data

(60) Provisional application No. 61/620,344, filed on Apr. 4, 2012.

(51) Int. Cl.
*G06F 17/30* (2006.01)

(52) U.S. Cl.
CPC ... *G06F 17/30442* (2013.01); *G06F 17/30339* (2013.01); *G06F 17/30584* (2013.01)

(58) Field of Classification Search
CPC .............................................. G06F 17/30339
USPC ................................................ 707/713, 665
See application file for complete search history.

(56) References Cited

U.S. PATENT DOCUMENTS

| 6,308,172 | B1 | 10/2001 | Agrawal et al. | |
|---|---|---|---|---|
| 8,209,294 | B2 * | 6/2012 | Shankar | G06F 17/30339 707/665 |
| 2008/0114749 | A1 * | 5/2008 | Chandhok | G06F 17/3087 707/5 |
| 2008/0256029 | A1 * | 10/2008 | Abrink | G06F 17/30339 707/2 |
| 2009/0198736 | A1 * | 8/2009 | Shen | G06F 17/30339 707/200 |
| 2009/0235043 | A1 * | 9/2009 | Jaiswal | G06F 17/30486 711/173 |

FOREIGN PATENT DOCUMENTS

| EP | 0675451 | 10/1995 | ............ G06F 17/30 |
|---|---|---|---|
| WO | WO 02/015054 | * 2/2002 | ....... G06F 17/30595 |

* cited by examiner

*Primary Examiner* — Apu Mofiz
*Assistant Examiner* — Chelcie Daye
(74) *Attorney, Agent, or Firm* — Harrity & Harrity, LLP

(57) ABSTRACT

Systems and methods for storing and retrieving data are disclosed where creation of new partitions in a database is driven by write requests. The requests can arrive at pseudo random moments of time. Each partition in the database is associated with a time interval. Different time intervals do not need to be consecutive. Whenever a write request is obtained, the system determines whether the write request is received within a latest partition time interval defined by start and end times. If yes, the data is written into a database partition corresponding to that interval. If not, a new partition is created having associated time interval with its own start and end times defining a new partition time interval. The process is repeated as new data is streaming in.

20 Claims, 5 Drawing Sheets

SYSTEM AND METHOD FOR STORING AND RETRIEVING DATA

CROSS-REFERENCE TO RELATED APPLICATIONS

The present invention claims priority from U.S. Patent Application No. 61/620,344, filed Apr. 4, 2012,, which is incorporated herein by reference.

TECHNICAL FIELD

The present invention relates to data management, and in particular to systems and methods for storing and retrieving data from databases.

BACKGROUND OF THE INVENTION

Wireless networks, such as 3G and long-term evolution (LTE) wireless networks, use control plane messages to connect to and control various wireless devices on the network. The control messages occupy a small percentage, about 1%, of a 15Gbps data stream. It is beneficial to record the control plane messages in real time for network troubleshooting and optimization purposes.

One percent of 15Gbps, or 150Mbps of digital data stream, is equivalent to 80,000 table rows per second. A database table, when filled at such a high speed, would exceed a billion rows in less than four hours, which would considerably slow down rows insertion and data search queries, making such a database fail to be updateable in real time.

One known method to avoid very large database sizes is database partitioning. A database can be broken into smaller, manageable units or segments, and rows insertion in those segments can be performed much faster. By way of example, Abrink in US Patent Application Publication 2008/0256029 discloses a partition management system for a real-time gaming database having at least one database table. The system comprises a clock-driven partition controller, which automatically and periodically creates table partitions in advance, so that at least one table partition is always available prior to a moment when a new data is received.

In the partition controller of Abrink, the partitions are created regardless of whether data storage requests are present. This can create many empty partitions, thus reducing the speed and efficiency of the database. Furthermore, requests to truncate old partitions may conflict with the data entry requests, which can lead to a lockout of the entire database.

SUMMARY OF THE INVENTION

It is an object of the invention to provide a system and method for storing and retrieving data in real time, while avoiding overfilling partitions, multiple empty partitions, and/or database lockouts caused by truncating old partitions.

In accordance with the invention, creation of new partitions in a database is driven by write requests, which can arrive at pseudo random moments of time. Each partition in the database is associated with a time interval. Different time intervals do not need to be consecutive. Whenever a write request is obtained, the system determines whether the write request is received within a latest partition time interval defined by start and end times. If the write request is received within the latest partition time interval, the data is written into a database partition corresponding to that interval. Otherwise if this condition is not met, a new partition is created having its own associated time interval with its own start and end times, the start time corresponding to the time when the new data was received. The process is repeated as new data is streaming in. In this way, overfilling the partitions can be mitigated, and creation of empty partitions can be avoided.

A "reaper" process is activated at each partition time interval to check whether a pre-defined maximum number of partitions is exceeded, and/or whether the maximum disk capacity is reached. If any of the two above conditions is fulfilled, the reaper truncates one or more oldest partitions. To avoid database lockout, the oldest partition(s) may be automatically excluded from a union table defining the database partitions being queried.

In accordance with the invention, there is provided a system for storing and retrieving data, the system comprising:

a request handler for processing requests to store and retrieve the data and configured to:

receive a first request within a first time interval to store first data;

provide a command to create a first database partition of a plurality of database partitions, the first database partition corresponding to the first time interval;

provide a command to store the first data in the first database partition;

receive a second request to store second data;

if the second request is received within the first time interval, provide a command to store the second data in the first database partition, otherwise:

provide a command to create a second database partition of the plurality of database partitions, the second database partition corresponding to a second time interval when the second request was received, and provide a command to store the second data in the second database partition;

a database management system operatively coupled to the request handler, for creating the first and second database partitions in a non-transitory storage medium and storing the first and second data therein, in response to the corresponding commands from the request handler; and a reaper operatively coupled to the database management system and configured to determine, in each of the first and second time intervals, that:

(I) a total size of data stored in the storage medium exceeds a pre-defined threshold; or (II) a total number of database partitions in the plurality of database partitions exceeds a pre-defined maximum partitions number;

wherein the reaper is configured to cause the database management system to truncate at least one oldest database partition of the plurality of database partitions when at least one of the conditions (I) or (II) is fulfilled.

In one embodiment, a file loader is operatively coupled to the request handler and the database management system. The request handler is configured to write the first data into a first file during the first time interval. The file loader is configured to read the first data from the first file during the second time interval, and to send a command to the database management system to store the first data in the first database partition. This is done to free the request handler for real-time operations.

In accordance with another aspect of the invention there is further provided a method for storing and retrieving data, comprising:

(a) receiving a first request within a first time interval to store first data;

(b) providing a command to create a first database partition of a plurality of database partitions, the first database partition corresponding to the first time interval;

(c) provide a command to store the first data in the first database partition;

(d) receiving a second request to store second data;

(e) if the second data store request is received within the first time interval, providing a command to store the second data in the first database partition; otherwise providing a command to create a second database partition of the plurality of database partitions, the second database partition corresponding to a second time interval when the second request was received, and providing a command to store the second data in the second database partition;

(f) causing a database management system to create the first and second database partitions in a non-transitory storage medium, and to store the first and second data therein in response to the corresponding commands of steps (b), (c), and (e); and (g) determining, in each of the first and second time intervals, that:

(I) a total size of data stored in the storage medium exceeds a pre-defined threshold; or (II) a total number of database partitions in the plurality of database partitions exceeds a pre-defined maximum partitions number; and (h) causing the database management system to truncate at least one oldest database partition of the plurality of database partitions when at least one of the conditions (I) or (II) is fulfilled.

BRIEF DESCRIPTION OF THE DRAWINGS

Exemplary embodiments will now be described in conjunction with the drawings, in which.

DETAILED DESCRIPTION OF THE INVENTION

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

Figure 1:
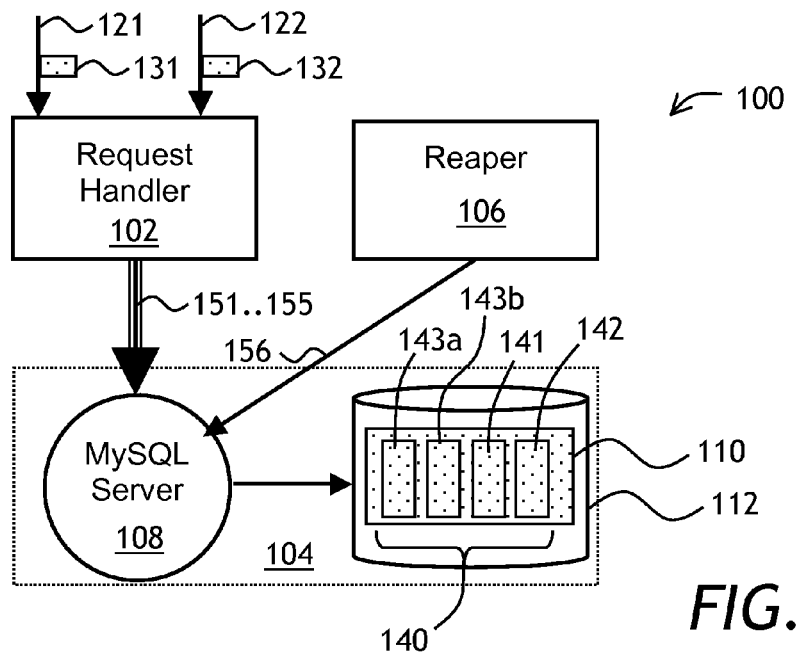
FIGS. 1 to 3 are block diagrams of different related embodiments of a system of the invention for storing and retrieving data.

Referring to FIG. 1, a system 100 for storing and retrieving data includes a request handler 102 for processing requests to store and retrieve data, a database management system 104 operatively coupled to the request handler 102, and a reaper 106 operatively coupled to the database management system 104, for managing the database size and the number of database partitions. In the embodiment shown, the database management system 104 includes a MySQL server 108 and a database 110 stored on a non-transitory storage medium, such as a hard disk 112.

In operation, the request handler 102 receives a first request 121 within a first time interval to store first data 131. In response to the first request 121, the request handler 102 provides a command 151 to the server 108 of the database 110 to create a first database partition 141 of a plurality of database partitions 140. The first database partition 141 corresponds to the first time interval. The request handler 102 then provides a command 153 to store the first data 131 in the first database partition 141. When the request handler 102 receives a second request 122 to store second data 132, if the second request 122 is received within the first time interval, then a command 154 is provided to the server 108 to store the second data 132 in the first database partition 141. If not, a command 152 is provided to create a second database partition 142 of the plurality of database partitions 140. The second database partition 142 corresponds to a second time interval when the second request 122 was received. Then, a command 155 is provided to the server 108 to store the second data 132 in the second database partition 142. The database management system 104 creates the first 141 and second 142 database partitions in the database 110 and stores the first 131 and second 132 data in the database 110 in response to the corresponding commands 151 ... 155 from the request handler 102. The process repeats, creating multiple database partitions, not shown. The database management system creates new partitions and stores data as the corresponding commands are received by the MySQL server 108.

In each time interval, the reaper 106 checks for at least one of the following conditions:

(I) a total size of data stored in the disk 112 exceeds a pre-defined threshold;
and (II) a total number of database partitions in the plurality of database partitions 140 exceeds a pre-defined maximum partitions number.

When at least one of the conditions (I) or (II) is fulfilled, the reaper 106 sends a command 156 to cause the database management system 104 to truncate at least one oldest database partition 143a, or preferably at least two oldest database partitions 143a, 143b of the plurality of database partitions 140.

Figure 2:
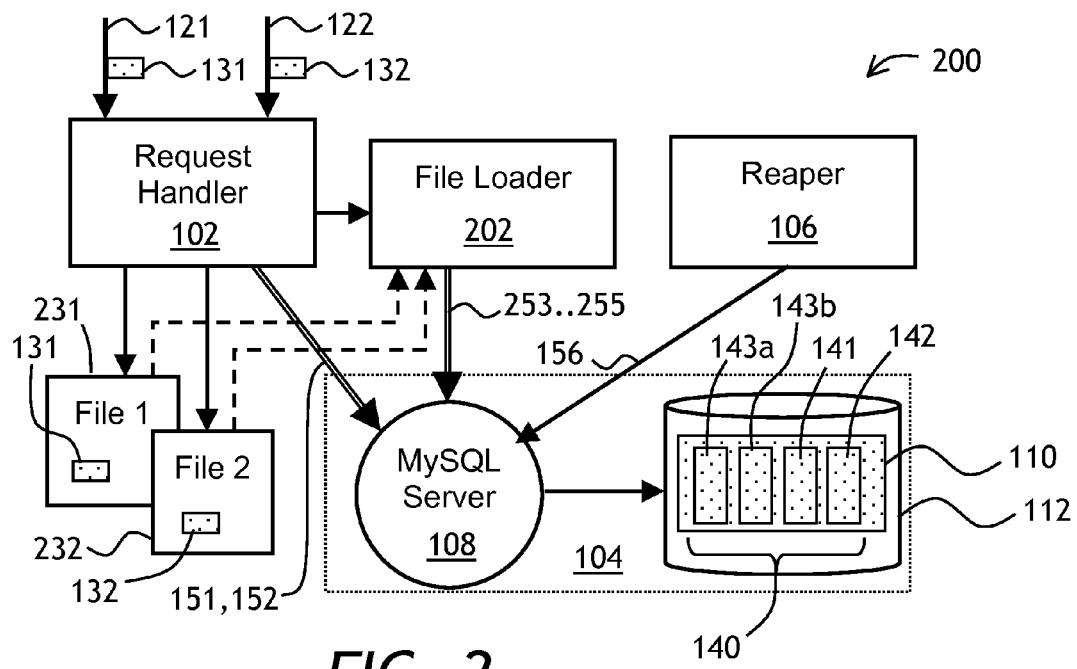

Turning to FIG. 2 with further reference to FIG. 1, a system 200 is a variant of the system 100 of FIG. 1. The system 200 of FIG. 2 further includes a file loader 202 operatively coupled to the request handler 102 and the database management system 104. In this embodiment, the request handler 102 writes the first data 131 into a first file 231 during the first time interval. The file loader reads the first data 131 from the first file 231 during the next, second time interval, and sends a command 253 to the server 108 of the database management system 104 to store the first data 131 in the first database partition 141.

When the second data store request 122 is received in the first time interval, the request handler 102 writes the second data 132 into a second file 232 during the first time interval. In this case, the file loader 202 will read the second data 132 from the second file 232 during the second time interval, and immediately send a command 254 to the database management system 104 to store the second data 132 in the first database partition 141. When the second data store request 122 is received in the second time interval, the request handler 102 writes the second data 132 into a second file 232 during the second time interval, and the file loader 202 reads the second data 132 from the second file 232 during a next, third time interval, and sends a command 255 to the database management system 104 to store the second data 132 in the second partition 142, and so on. In other words, the file loader 202 performs the tasks of writing files in the database 110 instead the request handler 102. This is done to free the request handler 102 from entering long files into the database 110, freeing resources for processing incoming data store requests in real time.

One feature of the systems 100 and 200 is that the partitions 141, 142, 143a, and 143b are created on "as-needed" basis. When no data write requests are present, no new partitions are created. Thus, the neighboring first and second partitions 141 and 142 may correspond to non-adjacent first and second time intervals.

Figure 3:
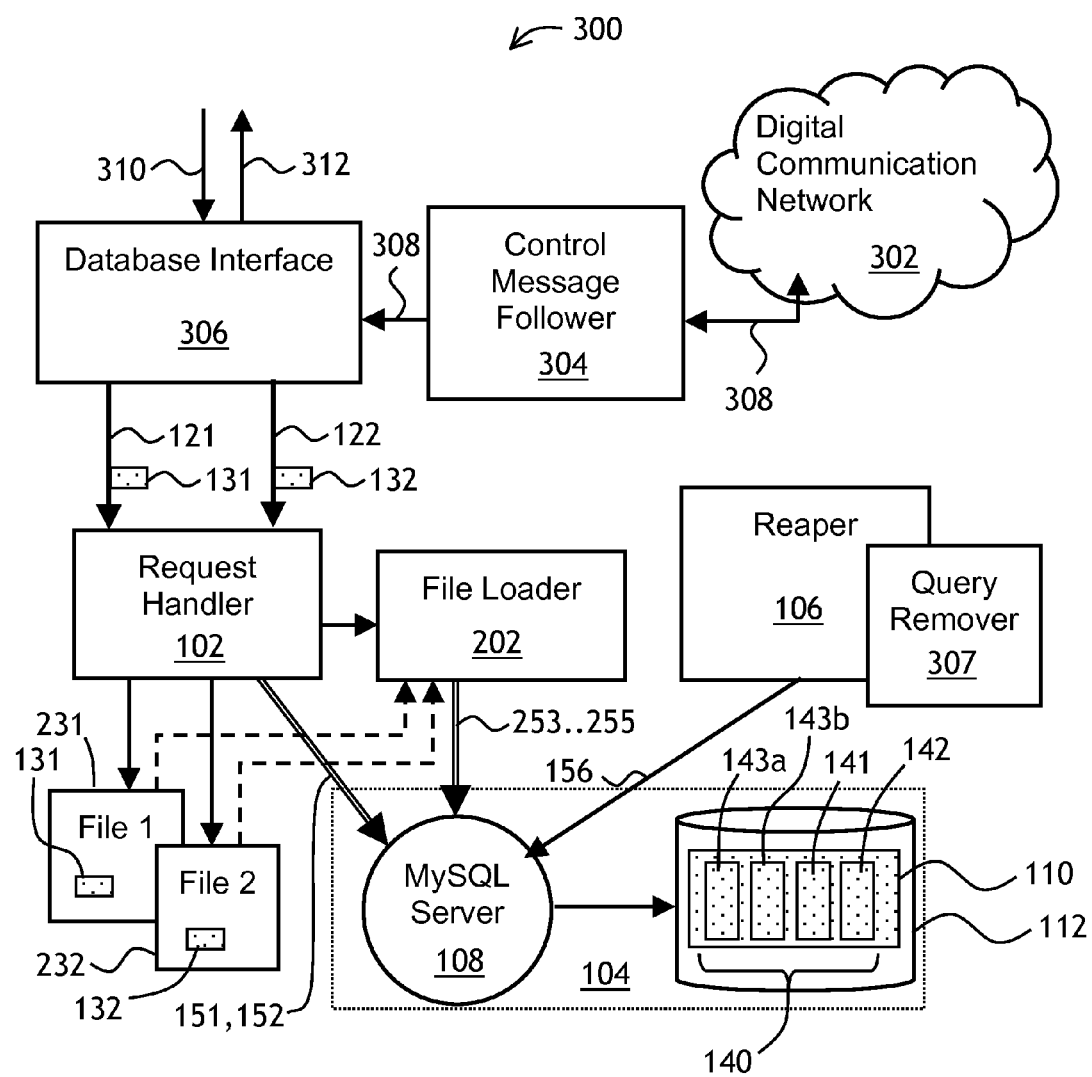

Turning now to FIG. 3 with further reference to FIG. 2, a system 300 is a variant of the system 200 of FIG. 2. The system 300 of FIG. 3 can be used with a digital communication network 302 employing control messages for controlling various wireless devices of the network, for storing these control messages in the database 110 for subsequent analysis and troubleshooting. The system 300 includes a control message follower 304 coupled to the digital communication network 302, and a database interface 306 coupled between the control message follower 304 and the request handler 102. The reaper 106 of the system 300 includes a query remover 307, the function of which will be described further below.

In operation, the control message follower 304 extracts control messages 308 from the digital communication network 302 and submits the extracted control messages 308 to the database interface 306. The database interface 306 generates the first 121 and second 122 requests, in which the first 131 and second 132 data include at least some of the control messages 308 submitted by the control message follower 304. The database interface 306 can be used for submitting to the request handler 102 data retrieval requests 310, and for displaying or forwarding results 312 of the requests 310.

Figure 4:
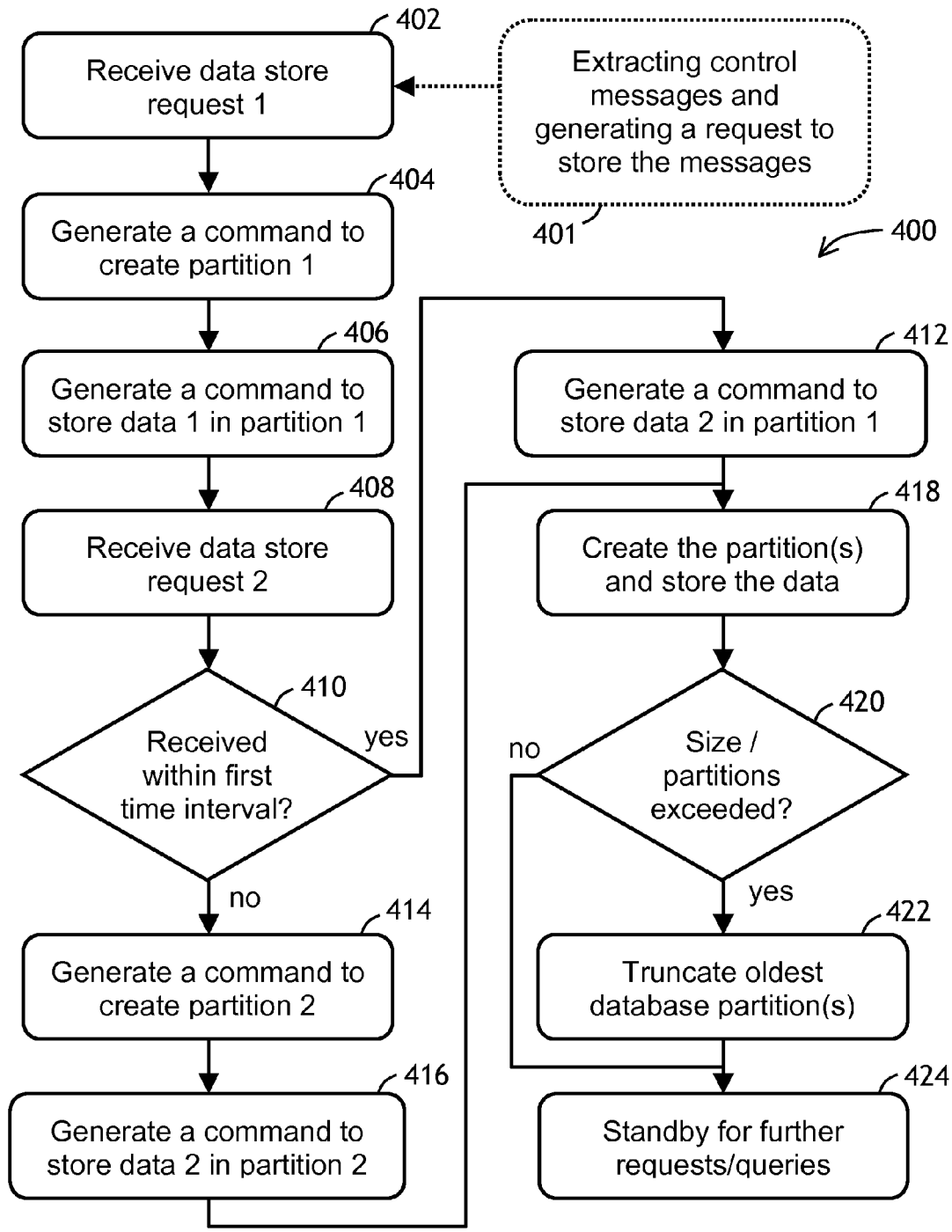
FIG. 4 is a flow chart of a method for storing and retrieving data usable with the systems of FIGS. 1 to 3.

Referring to FIG. 4 with further reference to FIG. 1, a method 400 for storing and retrieving data can be implemented in the system 100 of FIG. 1. In a step 402 of the method 400, the first request 121 is received within the first time interval to store the first data 131. In a step 404, the request handler 102 provides the command 151 to the server 108 of the database 110 to create a first database partition 141. In a step 406, the request handler 102 provides the command 153 to store the first data 131 in the first database partition 141. In a step 408, the request handler 102 receives the second request 122 to store the second data 132.

In a decision step 410, a check is performed if the second data store request 122 is received within the first time interval. If yes, then, in a step 412, a command is generated by the request handler 102 to the database management system 104 to store the second data 132 in the first database partition 141; otherwise, in a step 414, a command is generated by the request handler 102 to the database management system 104 to create the second database partition 142 of the plurality of database partitions 140; and then, in a step 416, a command is provided to store the second data in the second database partition.

In response to the commands 404, 406, 412, 414, and 416, as the case may be, the database management system 104 creates the first 141 and second 142 database partitions in the disk 112, and stores the first 131 and second 132 data in the first 141 and second 142 database partitions in a step 418. The database management system 104 creates partitions and stores data as the corresponding commands are received.

In a decision step 420 performed once during each time interval, the reaper 106 determines if the following conditions are fulfilled:

(I) a total size of data stored in the storage medium exceeds a pre-defined threshold; or (II) a total number of database partitions in the plurality of database partitions exceeds a pre-defined maximum partitions number.

If and when at least one of the conditions (I) or (II) is fulfilled, then in a step 422 the reaper 106 causes the database management system to truncate, or delete, at least one oldest database partition 143a or 143b of the plurality of database partitions 140. The system 300 then stands by for further requests or queries in a step 424.

Still referring to FIG. 4 with further reference now to FIG. 2, for the system 200 of FIG. 2, the method 400 of FIG. 4 can include writing the first data 131 received in the first request 121 to the first file 231 during the first time interval, and then, during the second time interval, reading the first data 131 from the first file 231 and causing the database management system 404 to store the first data 131 in the first database partition 141. The second data 132 can be written into the second file 232 during the first time interval when the second data store request 122 is received in the first time interval. These data are then read from the second file 232 during the second time interval, causing the database management system 104 to store the second data 132 in the first database partition 141. When the second data store request 122 is received in the second time interval, the second data 132 is stored during the third time interval in the second database partition 142, and so on. Thus, the data is stored in respective partitions according to the time when the corresponding store request is made. If no requests are made during a period of time, then no database partitions are created during that period of time. Thus, the time intervals corresponding to adjacent database partitions are not necessarily adjacent.

Still referring to FIG. 4 with further reference now to FIG. 3, for the system 300 of FIG. 3, the method 400 of FIG. 4 can include a step 401 of extracting the control messages 308 from the digital communication network 302 and generating the first 121 and second 122 requests. The first 131 and second 132 data corresponding to the first 121 and second 122 requests include at least some of the extracted control messages 308. The whole process including steps 402 to 424 repeats as new control messages 308 are extracted by the control message follower 304 in the step 401, which then generates requests to store the control messages 308 in corresponding partitions of the database 110.

Preferably, for applications of storing control messages generated in a control plane of a 3G or an LTE network 302, a fast database system is used, for instance, a MySQL MyIsam storage engine. The control message follower 304 can use the DatabaseInterface class to insert the control plane data 308 to the into the database 110. The database interface 306 can include a non-locking queue utilizing atomic Linux™ calls, so that the control message follower 304 will not be blocked. The request handler 102 can read from the queue and process the requests 121, 122. The request handler 102 can use the DbPartition class to determine what the current partition is, and write to files for each partitioned table for the current partition. When done, the file loader 202 can delete the files 231, 232.

The database 110 can include fast indexed tables including the control messages 308, for example call_trace
    call_trace_end
    call_trace_ue_id
    tunnel
    tunnel_end . . . and so on. A partition map table can be created that, for each partition, keeps track of a corresponding time interval. This table can be accessed by a PartitionMap class that is shared by multiple threads and uses a mutual exclusion techniques (so-called "mutex" techniques) to ensure thread safety. The PartitionMap class can provide the current partition, the previous partition, and an increment of the partition using the partition map table in the database 110.

Preferably, the data retrieval request 310 includes a time range of the control messages of interest. The request handler 102 can be configured to determine, based on the submitted time range, a subset of the plurality of database partitions 141, 142, 143a,143b,. . . , where data to be retrieved is located, and to query the database management system 104 to retrieve the data from the subset of database partitions. For instance, if the time range covers the first and second time intervals, the corresponding first 141 and second 142 partitions will be included into the subset and searched.

Figure 5:
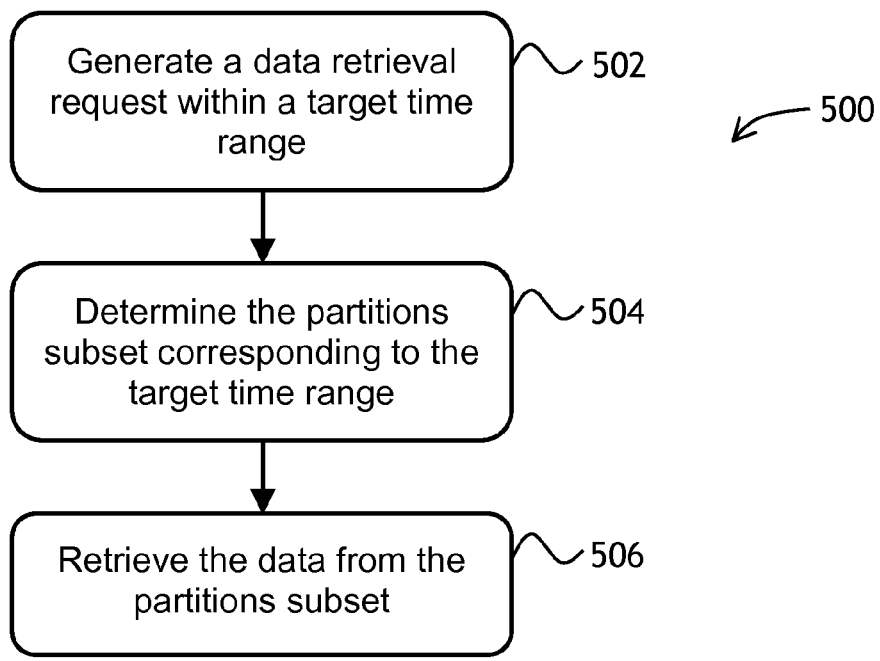
FIG. 5 is a flow chart of a method for data retrieval from the database of FIG. 3 within a target time range.
Figure 6:
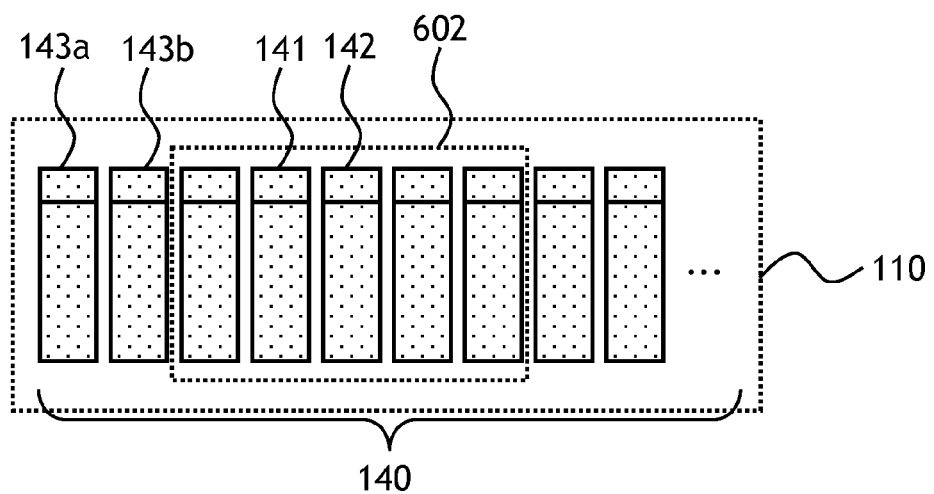
FIG. 6 is a schematic view of a database having database partitions grouped into a subset corresponding to the target time range.

Referring to FIG. 5 with further reference to FIGS. 4 and 6, a method 500 can be used to handle the time ranges of the requests. In a step 502, the data retrieval request 310 is submitted to database management system 104 through the database interface 306 and the request handler 102. The retrieval request 310 includes a target time range. In a step 504, the request handler 102 determines, based on the target time range, a first subset 602 of the plurality of database partitions 140 where data to be retrieved is located. Finally, in a step 506, the database management system 104 retrieves the data from the first subset 602. In FIG. 6, the first subset 602 includes, as an example, the first 141 and second 142 database partitions. In the determining step 504, the first subset 602 can be defined via a "merge table" including identifiers of the database partitions of the first subset 602. In the step 506, the database partitions of the first subset 602 can be queried as a union defined by the merge table, thereby preventing a concurrent write or truncate access to the database partitions of the union, while allowing a concurrent truncation of the at least one oldest database partition by the reaper 106 in the step 422. Preferably, an identifier of the at least one of the oldest database partitions 143a, 143b is automatically excluded from the merge table, thereby enabling the database management system 104 to allow the concurrent truncation of the at least one of the oldest database partitions 143a, 143b, in the truncating step 422. In this way, the "lockout" of the database 110 of FIGS. 1 to 3 can be prevented, because, regardless of the time range of the incoming data query 310, the oldest database partitions 143a, 143b will never be included into the union table, and thus will be subject to truncating by the reaper 106.

Figure 7:
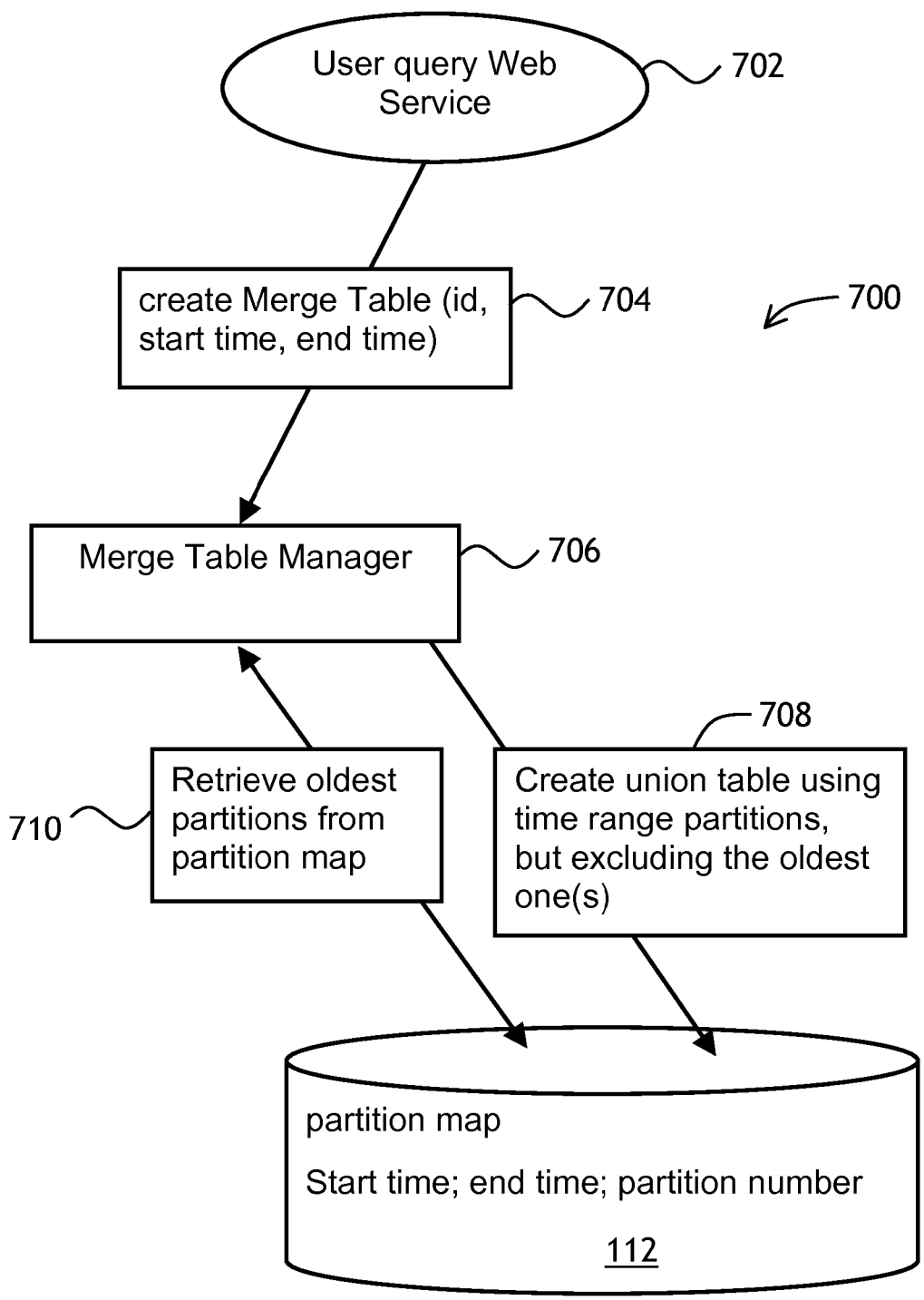
FIG. 7 is a flow chart of querying the database of FIG. 3 while avoiding a lockout of the database.

Referring now to FIG. 7 with further reference to FIGS. 3 and 6, a flow chart 700 further illustrates how creation of the union table helps prevent lockout of the database 110. In a step 702, a user queries the system 300 through the database interface 306 by submitting the data retrieval request 310. In a step 704, the request handler 102 creates a merge table based on the start time and end time of the control messages 308 retrieved and stored in the database 112. A merge table manager 706 creates, in a step 708, the union table of the subset 602 of the partitions, the time intervals of which overlap with the target time range; with an optional automatic exclusion of the oldest partitions 143a, 143b . Then, in a step 710, the MySQL server 108 retrieves the corresponding data from the database 112.

The purpose and function of the query remover 107 will now be explained. To ensure that no query submitted to the database management system 104 remains pending for an indefinite amount of time, the query remover 107 removes any removable query submitted to the database management system 104 that is pending for more than a pre-determined amount of time. Every time interval, the query remover 107 checks all pending MySQL queries in progress, and removes any "removable" queries that have been running greater than or equal to predetermined amount of time, for example 55 minutes. A "removable" query can be, for example, one that has the word "removable" and a unique id associated with it in a MySQL comment. When a query is removed, a resulting connection exception is caught by the web server query service, so that the merge tables can be dropped, and the user notified. The query remover 107 is a safety net in case any queries run longer than the 60 minutes. The query remover 107 is used as a precaution against any possible queries remaining in the system 300 and slowing down the performance of the system. The query remover 107 can also be included in the systems 100 and 200 of FIGS. 1 and 2, respectively.

The systems 100, 200, and 300 of FIGS. 1, 2, and 3, respectively, can be implemented in software or, at least partially, in hardware. When implemented in software, the functions in accordance with this invention may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage, other magnetic storage devices, or any other tangible storage medium that may be used to store desired program code in the form of instructions or data structures and that may be accessed by a computer or processor. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A system for storing and retrieving data, the system comprising:
   a memory; and
   a processor to:
      receive a first request within a first time interval to store first data;
      create a first database partition of a plurality of database partitions,
         the first database partition corresponding to the first time interval;
      store the first data in the first database partition;
      receive a second request to store second data;
      create a second database partition of the plurality of database partitions if the second request to store the second data is not received within the first time interval and based on receiving the second request, the second database partition corresponding to a second time interval when the second request was received,
         a start time of the second time interval being based on when the second data was received;
      selectively store the second data in the first database partition if the second request is received within the first time interval or in the second database partition if the second request is not received within the first time interval;
      determine, in each of the first and second time intervals, that at least one of:
         a total size of data stored in the memory exceeds a threshold; or
         a total number of database partitions in the plurality of database partitions exceeds a maximum partitions number; and
      truncate at least one oldest database partition of the plurality of database partitions based on at least one of the total size of data stored in the memory exceeding the threshold or the total number of database partitions exceeding the maximum partitions number.

2. The system of claim 1, where the processor is further to:
   write the first data into a first file during the first time interval; and
   read the first data from the first file during the second time interval.

3. The system of claim 2, where the processor is further to:
   write the second data into a second file during the first time interval when the second request is received in the first time interval; and
   read the second data from the second file during the second time interval.

4. The system of claim 1, where the first time interval and the second time interval are non-adjacent.

5. The system of claim 1, further comprising:
   a control message follower coupled to a digital communication network, and
   a database interface coupled between the control message follower and the processor;
   where the control message follower is configured to:
      extract control messages for network control from the digital communication network and submit the control messages to the database interface; and
   where the database interface is configured to:
      generate the first and second requests,
         the first data and the second data including at least some of the control messages submitted by the control message follower.

6. The system of claim 1, further comprising:
   a database interface coupled to the processor and configured to submit a data retrieval request including a target time range,
   where the processor is configured to determine, based on the target time range, a first subset of the plurality of database partitions where data to be retrieved is located, and to retrieve that data from the first subset.

7. The system of claim 6, where the first subset includes at least the first database partition and the second database partition.

8. The system of claim 6, wherein the processor, when determining the first subset, is configured to:
   define the first subset via a merge table including identifiers of database partitions of the first subset, and
   query the database partitions of the first subset as a union defined by the merge table,
      a concurrent write or truncate access to the database partitions of the union being prevented while allowing a concurrent request to truncate the at least one oldest database partition.

9. The system of claim 8, where the processor is further to not include into the merge table an identifier of the at least one oldest database partition, the at least one oldest database partition being truncated based on the identifier of the at least one oldest database partition not being included in the merge table.

10. The system of claim 8, where the processor is to:
    remove any removable query pending for more than a predetermined amount of time.

11. A method, comprising:
    receiving, by a processor, a first request within a first time interval to store first data;
    providing, by the processor, a command to create a first database partition of a plurality of database partitions, the first database partition corresponding to the first time interval;

providing, by the processor, a command to store the first data in the first database partition;
receiving, by the processor, a second request to store second data;
causing, by the processor, a second database partition of the plurality of database partitions to be created if the second request to store the second data is not received within the first time interval and based on receiving the second request,
  the second database partition corresponding to a second time interval when the second request was received,
  a start time of the second time interval being based on when the second data was received;
selectively causing, by the processor, the second data to be stored in the first database partition if the second request is received within the first time interval or to be stored in the second database partition if the second request is not received within the first time interval;
determining in each of the first and second time intervals that at least one of:
  a total size of data stored in a storage medium exceeds a threshold; or
  a total number of database partitions in the plurality of database partitions exceeds a maximum partitions number; and
causing, by the processor, at least one oldest database partition of the plurality of database partitions to be truncated based on at least one of the total size of data stored in the storage medium exceeding the threshold or the total number of database partitions exceeding the maximum partitions number.

12. The method of claim 11, further comprising
during the first time interval, writing the first data into a first file; and
during the second time interval, reading the first data from the first file.

13. The method of claim 12, further comprising:
writing the second data into a second file during the first time interval when the second request is received in the first time interval; and
reading the second data from the second file during the second time interval.

14. The method of claim 13, where the first time interval and the second time interval are non-adjacent.

15. The method of claim 11, further comprising:
extracting control messages for network control from a digital communication network; and
generating the first and second requests,
  the first and second data including at least one of the control messages.

16. The method of claim 11, further comprising
generating a data retrieval request including a target time range;
determining, based on the target time range, a first subset of the plurality of database partitions where data to be retrieved is located; and
causing the data to be retrieved from the first subset.

17. The method of claim 16, where the first subset includes at least the first database partition and the second database partition.

18. The method of claim 16, where determining the first subset includes:
defining the first subset via a merge table including identifiers of the database partitions of the first subset, and
where causing the data to be retrieved includes:
  querying the database partitions of the first subset as a union defined by the merge table,
    a concurrent write or truncate access to the database partitions of the union being prevented while allowing a concurrent truncation of the at least one oldest database partition.

19. The method of claim 18, where an identifier of the at least one oldest database partition is not included into the merge table,
the concurrent truncation of the at least one oldest database partition being allowed based on the identifier of the at least one oldest database partition not being included in the merge table.

20. A non-transitory computer-readable medium storing instructions, the instructions comprising:
one or more instructions which, when executed by a processor, cause the processor to:
  receive a first request within a first time interval to store first data;
  provide a command to create a first database partition of a plurality of database partitions,
    the first database partition corresponding to the first time interval;
  provide a command to store the first data in the first database partition;
  receive a second request to store second data;
  cause a second database partition of the plurality of database partitions to be created if the second request to store the second data is not received within the first time interval and based on receiving the second request,
    the second database partition corresponding to a second time interval when the second request was received,
    a start time of the second time interval being based on when the second data was received;
  selectively cause the second data to be stored in the first database partition if the second request is received within the first time interval or to be stored in the second database partition if the second request is not received within the first time interval;
  determine in each of the first and second time intervals that at least one of:
    a total size of data stored in a storage medium exceeds a threshold; or
    a total number of database partitions in the plurality of database partitions exceeds a maximum partitions number; and
  cause at least one oldest database partition of the plurality of database partitions to be truncated based on at least one of the total size of data stored in the storage medium exceeding the threshold or the total number of database partitions exceeding the maximum partitions number.

* * * * *